United States Patent [19]

Torigoe et al.

[11] Patent Number: 5,611,122
[45] Date of Patent: Mar. 18, 1997

[54] INTERENGAGING FASTENER HAVING REDUCED NOISE GENERATION

[75] Inventors: Shinji Torigoe; Akira Ito, both of Sagamihara; Shinichi Tominaga, Fuchu, all of Japan

[73] Assignee: Minnesota Mining and Manufacturing, St. Paul, Minn.

[21] Appl. No.: 277,198

[22] Filed: Jul. 19, 1994

[30] Foreign Application Priority Data

Jul. 28, 1993 [JP] Japan ................................ 5-185895

[51] Int. Cl.$^6$ .................................................. A44B 17/00
[52] U.S. Cl. .............................. 24/442; 24/306; 24/452; 428/100
[58] Field of Search ........................ 24/442, 443, 445, 24/444, 446–452, 306, 575–577; 428/100

[56] References Cited

U.S. PATENT DOCUMENTS

| | | | |
|---|---|---|---|
| 3,031,730 | 5/1962 | Morin | 24/204 |
| 3,192,589 | 7/1965 | Pearson | 24/452 |
| 3,266,113 | 8/1966 | Flanagan, Jr. | 24/204 |
| 3,320,649 | 5/1967 | Naimer | 28/72 |
| 3,408,705 | 11/1968 | Kayser et al. | 24/452 |
| 3,537,946 | 11/1970 | Truax et al. | 161/66 |
| 3,773,580 | 11/1973 | Provost | 156/66 |
| 3,849,840 | 11/1974 | Yamada et al. | 24/204 |
| 3,899,803 | 8/1975 | Brumlik | 24/204 |
| 3,899,805 | 8/1975 | McMillan . | |
| 4,169,303 | 10/1979 | Lemelson | 24/204 |
| 4,216,257 | 8/1980 | Schams et al. | 428/93 |
| 4,290,174 | 9/1981 | Kalleberg | 24/204 |
| 4,290,832 | 9/1981 | Kalleberg | 156/72 |
| 4,322,875 | 4/1982 | Brown et al. | 24/204 |
| 4,454,183 | 6/1984 | Wollman | 24/306 X |
| 4,776,068 | 10/1988 | Smirlock et al. | 24/442 |
| 4,783,039 | 11/1988 | Peterson et al. | 248/635 |
| 4,819,309 | 4/1989 | Behymer | 24/576 |
| 4,894,060 | 1/1990 | Nestegard | 604/391 |
| 4,933,224 | 6/1990 | Hatch | 428/100 |
| 4,984,339 | 1/1991 | Provost et al. | 24/452 |
| 5,040,275 | 8/1991 | Eckhardt et al. | 24/447 |
| 5,077,870 | 1/1992 | Melbye et al. | 24/452 |
| 5,100,400 | 3/1992 | Mody et al. | 604/391 |
| 5,140,727 | 8/1992 | Dais et al. | 24/587 |
| 5,149,573 | 9/1992 | Kobe et al. | 428/93 |
| 5,179,767 | 1/1993 | Allan | 24/442 |
| 5,212,853 | 5/1993 | Kaneco | 24/442 X |
| 5,235,731 | 8/1993 | Anzai et al. | 24/576 |
| 5,242,646 | 9/1993 | Torigoe et al. | 264/219 |
| 5,369,852 | 12/1994 | Higashinaka | 24/446 |
| 5,398,387 | 3/1995 | Torigoe et al. | 24/452 |

FOREIGN PATENT DOCUMENTS

| | | | |
|---|---|---|---|
| 0258015 | 3/1988 | European Pat. Off. | A44B 18/00 |
| 2264209 | 3/1974 | France | F16B 5/07 |
| 1-238805 | 9/1989 | Japan | A44B 18/00 |
| 2-134012 | 11/1990 | Japan | A44B 18/00 |
| 4-123106 | 4/1991 | Japan | A44B 18/00 |
| 4-338402 | 5/1991 | Japan | A44B 18/00 |
| 1510558 | 5/1978 | United Kingdom | B60R 13/02 |
| WO89/08201 | 9/1989 | WIPO | F16B 5/07 |
| WO92/19119 | 11/1992 | WIPO | A44B 18/00 |

*Primary Examiner*—Peter M. Cuomo
*Assistant Examiner*—Robert J. Sandy
*Attorney, Agent, or Firm*—Gary L. Griswold; Walter N. Kirn; Charles D. Levine

[57] ABSTRACT

An interengaging fastener member having a plurality of headed elements, which can reduce the noise generated due to the relative movement between the headed elements engaged with each other. The fastener member 10 is made of polymeric material as a one-piece molded article, and includes a generally flat base 14 and a plurality of headed elements 18 projecting from the base 14. Each headed element 18 has a stem 22 arranged on and projecting from the base 14 in a predetermined spaced relationship, and a head 24 formed at the end of the stem 22 and having a contour swollen from the periphery of the stem 22. The head 24 is defined by a generally flat surface 26 adjacent t the stem 22 and extending radially outward from the periphery of the stem 22, a curved surface 28 bulging out with an apex and arranged at an opposite side of the generally flat surface 26 from the stem 22, and a transition surface 30 formed from a second curved surface for connecting the generally flat surface 26 with the curved surface 28.

13 Claims, 3 Drawing Sheets

5,611,122

INTERENGAGING FASTENER HAVING REDUCED NOISE GENERATION

TECHNICAL FIELD

The present invention relates to an interengaging fastener member, and more particularly to an interengaging fastener member that, when interengaged with a second, like fastener member, produces less noise than conventional fasteners.

BACKGROUND OF THE INVENTION

One common type of interengaging fastener includes two opposed fastener members, each of which has a base and a plurality of headed elements that project from the base. By compressively engaging the fastener members, the fastener may be used to detachably fasten two articles together. Such fasteners are advantageous because they may be engaged with a relatively low compressive force, while requiring a relatively high tensile force to disengage. A further advantage is that such fastener members are inexpensive to produce when compared to fasteners having different (such as male and female) fastener members.

A conventional fastener including a pair of interengaging fastener members of the type described above is illustrated in FIG. 6. This fastener includes a first fastener member 1 and a second fastener member 2, each being generally formed from polymeric material. The first and second fastener members 1 and 2 are provided with generally flat bases 3 and 4, respectively, and a plurality of headed elements 5 arranged on the bases 3 and 4 in a predetermined spaced relationship. Each of the headed elements 5 includes a stem 6 projecting generally orthogonally from the base, and head 7 formed at an end of the stem. The head is generally hemispherical, and has a larger diameter than the stem. The head 7 of each headed element 5 has a generally flat locking surface 8 adjacent to the stem 6 and extending radially outward from the periphery of the stem 6, and a bulgingly curved surface 9 with an apex, positioned opposite to the stem 6 relative to the locking surface 8.

The first fastener member 1 and the second fastener member 2 may be positioned so that the bases 3 and 4 are arranged substantially parallel to each other, while the headed elements 5 are mutually opposed, as shown in FIG. 6(a). In this position, when a predetermined compressive engagement force is applied to the respective bases 3 and 4, the head 7 of the headed element 5 of one fastener member comes into contact with and slides against, at the curved surface 9 thereof, the heads 7 of the adjacent headed elements 5 of the other fastener member. In so doing, the stems 6 of the headed elements 5 bend laterally, and thus bypass the opposed headed elements in the space between the adjacent headed elements 5. This is shown in FIG. 6(b). In this position, the headed elements 5 of one fastener member are engaged at the locking surfaces 8 of the heads 7 thereof with the locking surfaces 8 of the heads 7 of the headed elements 5 of the other fastener member. Thus, the first fastener member 1 and the second fastener member 2 are releasably attached to each other.

In the conventional fastener made from two like fastener members having headed elements, the headed element in the respective fastener member is generally formed so that a length of the stem is longer than a height of the head. Therefore, when the fastener members are mutually interengaged, the heads of the headed elements of one fastener member can be moved within the space between the adjacent stems of the other fastener member. Stated differently, when the locking surface of the heads of the engaged fastener members are in contact with each other, a gap corresponding to a difference between the length of the stem and the height of the head is formed between the apex of the curved surface of the head of the headed element of one fastener member and the surface of the base on the other fastener member. This gap is used to allow the headed element to tilt during the interengagement process to reduce the engagement force, and thus it is not desirable to eliminate the gap described above.

Due to this gap, however, when the heads of the headed elements are relatively displaced while interengaged, noise may be generated between the heads, or between the head and the opposed stem, due to frictional contact. Even if the gap were to be eliminated, the noise may be still generated particularly between the locking surface of the heads, due to lateral movement therebetween caused by vibration or the like. Hence, it would be desirable to provide a fastener that reduces the generation of such noises, particularly for applications in which minimal noise is desired.

SUMMARY OF THE INVENTION

The present invention includes an interengaging fastener member, comprising a base; a plurality of headed elements arranged on the base in a predetermined spaced relationship, each of the headed elements including a stem projecting from the base, and a head connected to an end of the stem, the head of each headed element including a generally flat surface adjacent to the stem and extending radially outward from a periphery of the stem, and a curved surface bulging out with an apex and arranged at an opposite side of the generally flat surface from the stem; and means for reducing noise due to relative movement between the fastener member and a second, like fastener member interengaged with the first fastener member.

BRIEF DESCRIPTION OF THE DRAWINGS

The present invention will be further explained with reference to the appended Figures, wherein like structure is referred to by like numerals throughout the several views, and wherein.

DETAILED DESCRIPTION THE INVENTION

The present invention provides a fastener comprising fastener members that, when interengaged, attenuate the noise produced by relative movement between the fastener members. The noise reducing structures provided according to the invention are intended not to interfere with the normal operation of the fastener, and may include such things as modified head structures, or materials that are placed or applied on the base member in the area adjacent the stems of the fastener member. These and other structures will be described in greater detail below.

Figure 1A:
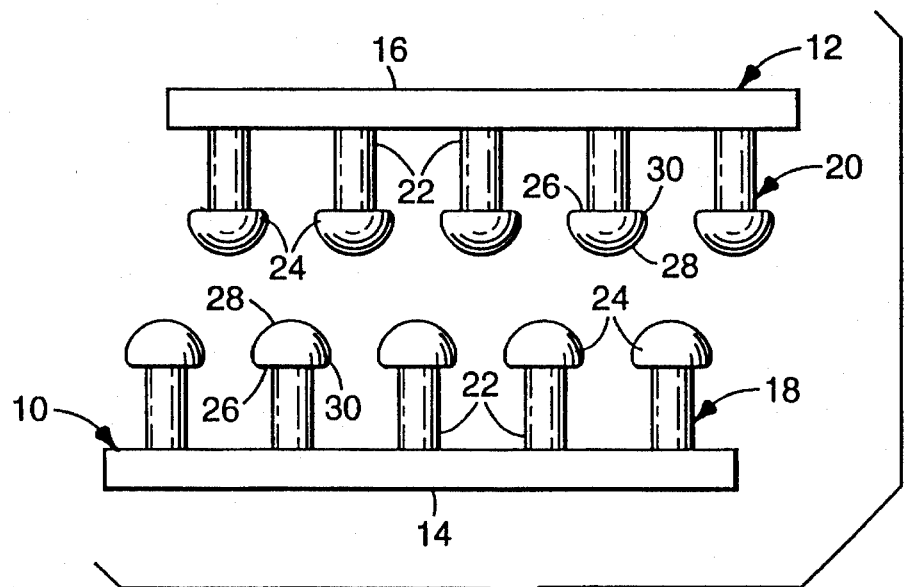
FIGS. 1(a) and 1(b) are schematic side views of a fastener before, and after, engagement respectively.
Figure 1B:
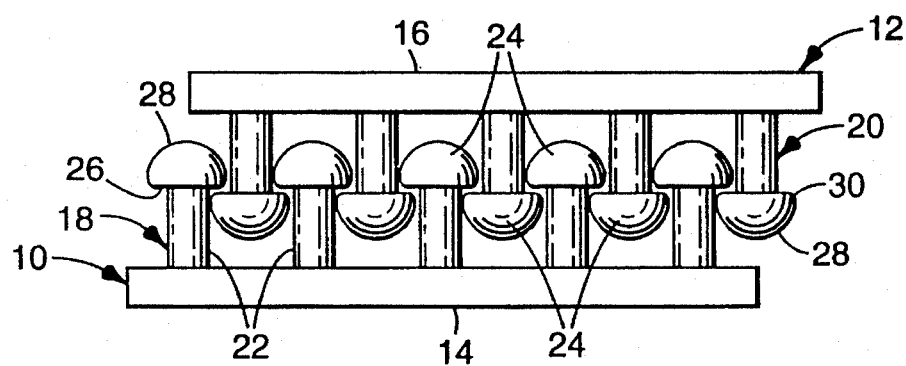

Referring to the drawings, FIG. 1 shows a fastener including a pair of interengaging fastener members 10 and 12, according to one embodiment of the present invention. Each of the fastener members is preferably molded of a polymeric material, and more preferably as a unitary structure. The fastener members include a generally flat base 14 and 16, and a plurality of headed elements 18 and 20 arranged on the base in a predetermined spaced relationship. Each of the headed elements 18 and 20 is provided with a stem 22 projecting generally orthogonally from the base 14 and 16, and a head 24 formed at the end of the stem 22 and having a larger diameter than the diameter of the stem 22. The stem 22 and the head 24 of each headed element 18 and 20 have arrangements and dimensions enabling the headed elements 18, 20 to be interengaged together by the heads 24, as shown in FIG. 1(b) and as known in the art. It should be noted that variations of the illustrated embodiments of the present invention are intended, and may include such features as a curved base, longer or shorter stems, or the like.

Figure 2:
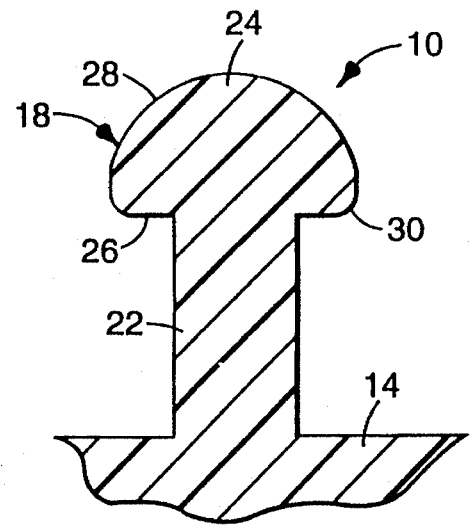
FIG. 2 is an enlarged sectional view of a headed element of the fastener member shown in FIG. 1.

As shown in FIGS. 1 and 2, the head 24 of each headed element 18 and 20 is defined by a generally flat surface 26 adjacent to the stem 22 and extending radially outward from the periphery of the stem 22. The apex of the head is defined by a curved surface 28, and opposes the generally flat surface 26 from the stem 22. The noise reducing feature of the fastener member is provided by a transition surface 30, consisting of a second curved surface for connecting the generally flat surface 26 with the curved surface 28. The transition surface is a second curved surface having a predetermined radius of curvature. The radius of curvature of the transition surface is preferably between 0.05 mm and 0.5 mm, although other radii are also contemplated. Alternatively, the radius of curvature of the transition surface may be between 5% and 20% of a maximum projected diameter of the head taken parallel to the generally flat surface. The transition surfaces reduce the noise generating effects of the sharp edges provided on the heads of prior art fastener members. Although the head 24 has a roughly hemispherical shape enveloped by these surfaces 26, 28, 30, and is connected with the end of the stem 22 at substantially a center of the generally flat surface 26, other head shapes that produce the inventive noise reducing feature are also within the scope of the invention.

To engage the fastener, the fastener members 10, 12 are positioned as shown in FIG. 1(a), so that the bases 14 and 16 are arranged substantially parallel to each other while the headed elements 18 oppose the headed elements 20. In this position, when a predetermined compressive pressure is applied on the respective bases 14 and 16, the heads 24 of the headed elements of one fastener member come into contact with and slide against (at the curved surface 28 thereof) the heads 24 of the headed elements of the other fastener member. At this time, the stems 22 of the headed elements 18, 20 are resiliently bent by the slide and contact between the curved surfaces 28, whereby the heads 24 of one fastener member enter into a space between the adjacent stems 22 of the other fastener member. Thus, the curved surfaces 28 of the heads 24 of the headed elements 18, 20 serve as guide surfaces for the heads 24 of the counterpart headed elements.

When the heads 24 of the headed elements 18, 20 of the respective fastener members 10, 12 have entered into spaces between the adjacent stems 22 of the counterpart fastener members, the generally flat surfaces 26 of the heads 24 of the headed elements 18 come into contact with the generally flat surfaces 26 of the heads 24 of the headed elements 20, and thereby the headed elements 18, 20 are locked with each other, as shown in FIG. 1(b). Thus, the generally flat surfaces 26 of the heads 24 of the headed elements 18, 20 serve as locking surfaces for the heads 24 of the counterpart headed elements. Because the transition surface 30 of the head 24 of each headed element 18, 20 smoothly connects the generally flat surface 26 with the curved surface 28 as described before, scratch noises caused by touch or slide motion between the generally flat and transition surfaces 26, 30 and the opposed head 24 and stem 22 of the counterpart are effectively reduced. In addition, because the height of the head 24 can be designed smaller than the length of the stem 22, the headed elements 18, 20 are easily bent when the fastener members 10, 12 are engaged with each other, and thereby an engagement force necessary for interengaging them can be maintained at a lower level.

As shown in FIG. 2, the transition surface 30 of the head 24 is preferably formed from a second curved surface having a predetermined radius of curvature. However, the transition surface may be formed by combining a plurality of flat surfaces. The radius of curvature of the transition surface 30 of the head 24 is preferably between 0.05 mm and 0.5 mm. If the radius of curvature is not more than 0.05 mm, the noise reduction effect may be insufficient. On the other hand, if the radius of curvature exceeds 0.5 mm, a force necessary to disengage the engaged fastener members (i.e. the engagement-retaining force of the fastener members) becomes too low. It is preferred that the radius of curvature of the transition surface 30 be between 5% and 20% of the maximum projected diameter of the head 24 taken parallel to the generally flat surface 26, in relation to the dimensions of the head 24. The maximum projected diameter of the head 24 thus can be, for example, between 0.5 mm and 4.0 mm.

Further as shown in FIG. 2, the generally flat surface 26 of the head 24 of each headed element may extend substantially parallel to the surface of bases 14 and 16. The dimensions and shape of the generally flat surface 26 can be designed so that the disengagement force can be maintained at a desired level. For example, the radial distance of the generally flat surface 26 is preferably between 15% and 35% of a maximum diameter of the head 24 projected taken generally parallel to flat surface 6. If this value is not more than 15%, the disengagement force tends to be unacceptably low. If the radial distance exceeds 35% of the maximum diameter of the head, a sufficient noise reduction effect is difficult to obtain.

Figure 3:
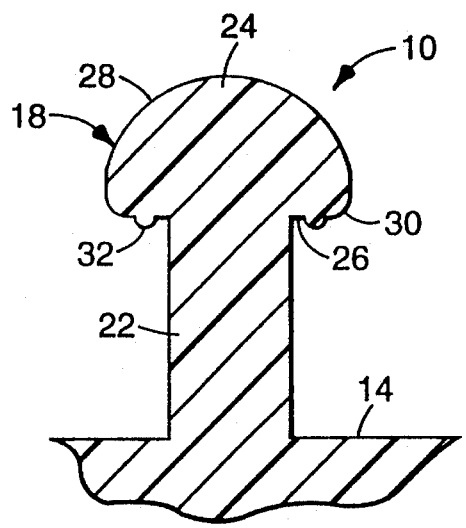
FIG. 3 is an enlarged sectional view of a headed element according to an embodiment of the present invention.

As shown in FIG. 3, the means for reducing noise can take the form of small protrusions 32 on the generally flat surface 26 of the head 24, while maintaining a disengagement force at a required level. The number, shape, and dimensions of the protrusions 32 may be suitably designed while taking into account a disengagement force retention effect as well as dimensions of the stem 22 and the head 24. A height of the protrusion is preferably in a range of 0.1 mm through 0.5 mm. If this value is not more than 0.1 mm, the disengagement force retention effect is insufficient, while, if exceeding 0.5 mm, a sufficient noise reduction may be difficult to obtain.

In the above embodiment, each fastener member 10 and 12 may have any dimensions and shape. For example, the base 14 and 16 may be formed with dimensions and shapes that enable the base to fixedly hold headed elements 18 and 20. Also, bases 14 and 16 may be provided with fixing means, such as a hook, for fixing the fastener member to the objects. The stem 22 of headed elements 18 and 20 may be formed in various shapes, such as a cylinder, a prism, or a frustum, and more than one stem 22 may be provided for each headed element. In the fastener shown in FIG. 1, it is possible that only one fastener member has headed elements including transition surfaces.

Figure 4A:
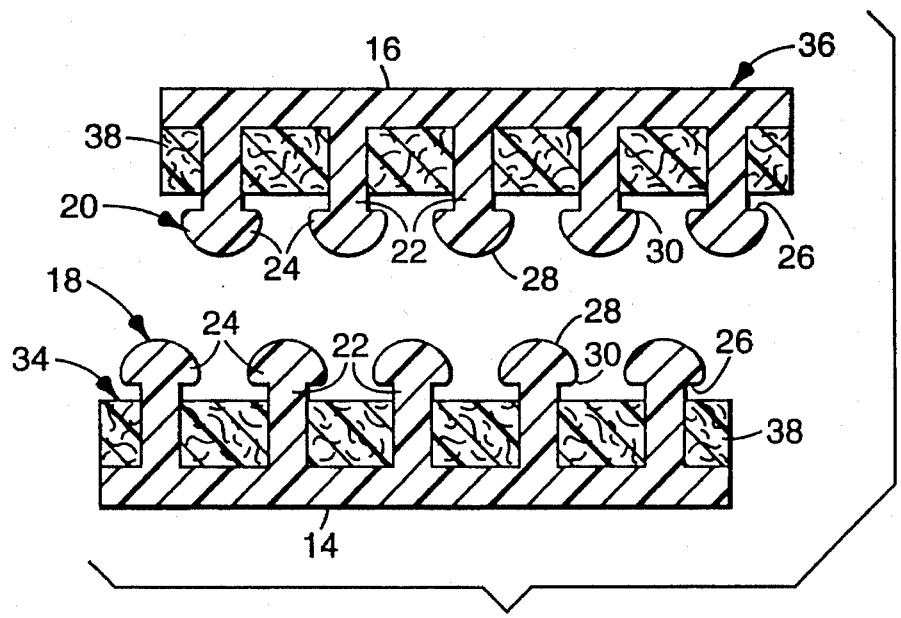
FIGS. 4(a) and 4(b) are schematic side views of a fastener according to an embodiment of the present invention before, and after engagement, respectively.
Figure 4B:
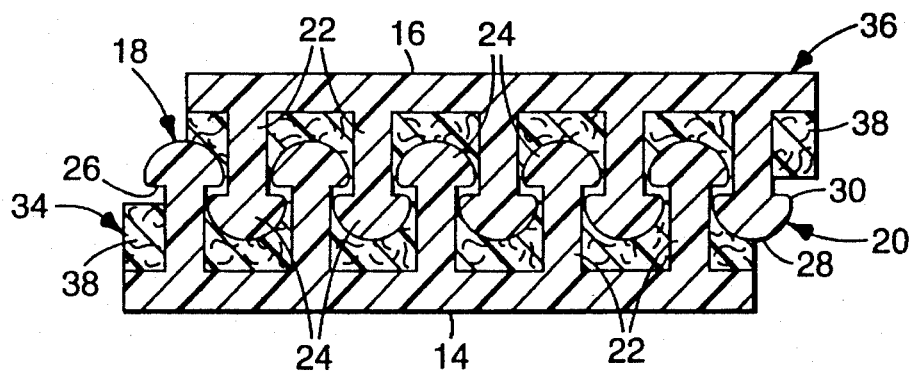

FIGS. 4a and 4b shows a fastener having a pair of fastener members 34 and 36 according to another embodiment of the present invention. Each fastener member includes a body section having essentially the same structure as that of the fastener members 10 and 12 shown in FIG. 1, and noise reducing means in the form of a shock absorbing material 38 disposed around the stems 22 of headed elements 18 and 20 in the body section. The shock absorbing material 38 can assist the noise reduction effect by restricting the relative movement of headed elements 18 and 20 when fastener members 34 and 36 are engaged with each other. The shock absorbing material 38 may be made of various materials, and preferably includes at least one of glass wool, sponge, non-woven fabric, cotton, and viscoelastic adhesive. Also, the shock absorbing material 38 is preferably disposed in an area from a surface of bases 14 and 16 to 50% through 90% of the height of the stems 22 of headed elements 18 and 20. In the fastener shown in FIGS. 4a and 4b only one fastener member may have the shock absorbing material 38.

Figure 5:
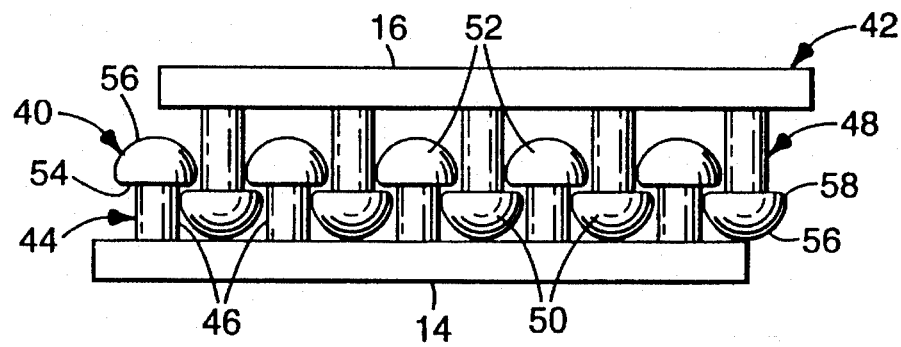
FIG. 5 is a schematic side view of a fastener according to an embodiment of the present invention after being engaged.
Figure 6A:
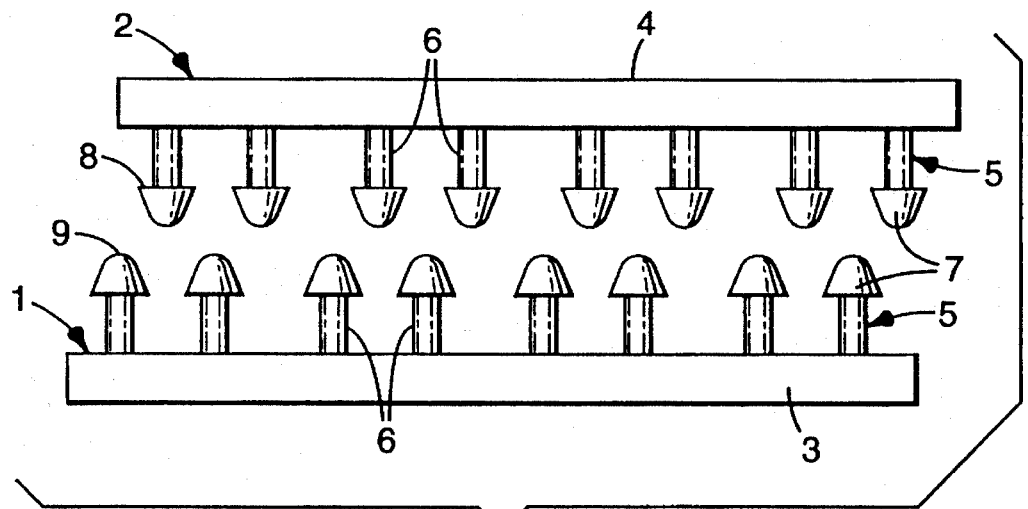
FIGS. 6(a) and 6(b) are schematic side views of fasteners according to the prior art before, and after engagement, respectively.
Figure 6B:
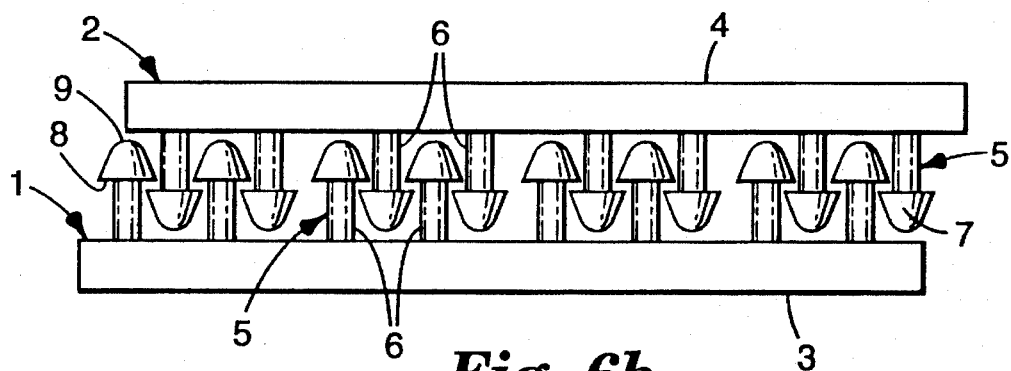

FIG. 5 shows a fastener having fastener members 40 and 42 according to a further embodiment of the present invention. In this fastener member, the noise reducing means comprises making the length of the stems 46 of one fastener member substantially equal to height of heads 50 of the other fastener member. In addition, each head 52 of the fastener member 40, as well as each head 50 of the fastener member 42, is defined, similar to the headed elements 18, 20 in the embodiment shown in FIG. 1, by a generally flat surface 54, a curved surface 56 bulging out with an apex, and a transition surface 58 formed from a second curved surface for connecting the generally flat surface 54 with the curved surface 56. Accordingly, relative movement between the mutually engaged fastener members 40 and 42 can be minimized, and thereby the noise reduction feature produced by the transition surface 58 of heads 50 and 52 is further enhanced. Moreover, as shown in the figure, near the fastener member 42, a gap is maintained between the base surface thereof and the apex of each head 52 of the headed element 44 of the fastener member 40, and thus the operatability in an interengaging process is not significantly reduced.

Also, a protrusion may be formed on the generally flat surface of the head of each of the headed elements as described above with reference to the embodiment shown in FIG. 3. In addition, or alternatively, a shock absorbing material may be arranged around the stem of each of the headed elements as described above with reference to FIG. 4. In this case, the shock absorbing material may include at least one of a glass wool, a sponge, a non-woven cloth, a cotton and a viscoelastic adhesive. In such an interengaging fastener member, the base and the headed elements may be integrally made of polymeric materials. Also, the base and the headed elements may be integrally molded by an injection molding process using a destructible stem mold.

The fastener members of the present invention may be made of various materials. For example, polyamide resin, polypropylene resin, or polyethylene resin is used for the bases 14 and 16. Particularly, polyamide resin is one of the more suitable materials because of its superior heat resistance, mechanical strength, and its usefulness in injection molding. As is well known in the art, the bending modulus of elasticity of the materials can be optionally modified or changed in such a manner as adding plasticizer and filler, adjusting molecular weight, or varying the glass transition temperature. When woven or non-woven fabric is used for the material of the bases 14 and 16, the fastener members can made more flexible. If the back surface of the base is provided with a metal layer, it is possible to obtain a ground to the attached object, and to improve adherence when being fixed to the object by adhesive.

Headed elements 18 and 20 may be made of the same polymeric materials as bases 14 and 16. Particularly, the head 24 is preferably made of a material having a bending modulus of elasticity in a range of $10^3$ kgf/cm$^2$ to $10^5$ kgf/cm$^2$ according to a measurement based on ASTM D790, for obtaining a desired noise reduction effect while maintaining sufficient durability. Also, the bases and the stems of headed elements 18 and 20 may be made of a high-strength material different from the material of the heads 24, for improving a durability of fastener members 10 and 12.

The fastener members may be formed by various methods. For example, the fastener member may be made with a conventional shape (which has no transition surface 30 on the head 24 of the headed element 18 and 20) by a known molding process, and thereafter, the transition surface 30 may be formed on the head 24 by, for example, heat-melting with hot air or an infrared heater, mechanical abrasion, or solvent dissolution. However, from a viewpoint of molding accuracy and readiness of procedure, it is advantageous to integrally mold the base and the headed elements by an injection molding process using a destructible stem mold. In this regard, the destructible stem mold is a general term of a mold which is used as a core in a metal mold and which can be removed by, for example, ultrasonic vibration, melting, water or solvent dissolution, or disintegration. In this case, the destructible stem mold is used as a mold for stems 22 of the headed elements 18, 20, and, after integrally molding the stems 22 with the base 14, 16 and the heads 24 of the headed elements 18, 20, the destructible stem mold is removed by the mechanical or chemical method. This method is described in greater detail in U.S. Pat. No. 5,242,646 (Torigoe et al.), the contents of which is incorporated herein by reference.

EXAMPLES

Various experiments were carried out to demonstrate the noise reduction effects according to the fasteners members of the present invention, and are described below.

Engagement Force

Compressive force required for engaging the headed elements of a pair of fastener members with each other were measured by an Autograph type tester, while compressing both fastener members in a mutually approaching direction at a compression speed of 100 mm/min, and thereby an engagement force was evaluated.

Disengagement Force

Stretching forces required for disengaging the engaged headed elements of a pair of fastener members from each other were measured by an Autograph type tester, while stretching both fastener members in a separating direction at a stretching speed of 100 mm/min, and thereby a disengagement force was evaluated.

Retention of Disengagement Force

The numbers of repetitions of engagement/disengagement were measured until the disengagement force is lowered to half an initial value thereof, and thereby a retention of disengagement force was evaluated.

Noise Reduction Effect

The amount of noise generated by a pair of engaged fastener members while being regularly twisted and vibrated by hands, were measured by a "Rion" noise meter (NA-29E) at a position of 10 mm distant from a noise collecting microphone, and thereby the noise reduction effects of the inventive fastener was evaluated. The measurement were carried out for three times at each frequency level of 125 Hz, 250 Hz, 500 Hz, and 1000 Hz, and the results of the measurement were averaged.

These experiments were carried out on various fastener members prepared by changing a radius of curvature of a transition surface and a radius of a head (Numbers 1 through 5); by adding protrusions onto a generally flat surface of a head (Number 6); by providing a shock absorbing material (Number 7); and by changing a material (Number 8). The height of the protrusion in Number 6 is 0.1 mm, and the shock absorbing material in Number 7 is a non-woven fabric with 0.8 mm thickness. The dimensions of the fastener member are 7.5 mm ×40 mm, the length of a stem is 1.2 mm, the materials of Example Numbers 1 through 7 are polyamide resin with a bending modulus of elasticity of 40,000 kgf/cm$^2$, and the material of Number 8 is polyethylene resin with a bending modulus of elasticity of 10,000 kgf/cm$^2$. The results are listed in Table 1 below.

TABLE 1

| # | Radius of Curvature of Transition Surface: R (mm) | Maximum Projected Diameter of Head: D (mm) | R/D × 100 (%) | Engagement Force (kgf/cm$^2$) | Disengagement Force (kgf/cm$^2$) | Retention of Disengagement Force (number) | Noise Reduction Effect (DB) |
|---|---|---|---|---|---|---|---|
| 1 | 0   | 1.2 | 0  | 5.0 | 6.0  | 18  | 52.9 |
| 2 | 0.1 | 1.2 | 8  | 4.5 | 5.0  | 30  | 34.5 |
| 3 | 0.2 | 1.2 | 17 | 4.0 | 4.5  | >50 | 31.1 |
| 4 | 0.3 | 3.0 | 10 | 8.0 | 10.0 | >50 | 28.6 |
| 5 | 0.6 | 1.2 | 50 | 2.0 | 1.0  | >50 | 20.5 |
| 6 | 0.1 | 1.2 | 8  | 4.5 | 5.5  | 30  | 35.9 |
| 7 | 0.1 | 1.2 | 8  | 4.5 | 5.0  | 32  | 21.0 |
| 8 | 0.1 | 1.2 | 8  | 3.0 | 3.5  | >50 | 25.0 |

As shown in the foregoing table, Example Numbers 2, 3, 6, 7, and 8, exhibit good sound reducing qualities, while minimizing the increase of the engagement force of the fastener and the deterioration of the engagement-retaining force.

As apparent from the above description, according to the present invention, a fastener constructed by a combination of a pair of interengaging fastener members with headed elements is provided, which can reduce noise generated due to the relative movement of the headed elements when the fastener members are mutually engaged, without damaging an operatability for engaging the fastener members with each other. Therefore, the fastener member and the fastener, according to the present invention, can be suitably used for application with strict quiet requirement, such as an attachment of an inner trim of a vehicle.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. An interengaging fastener member, comprising:
   a) a base;
   b) a plurality of headed elements arranged on said base in a predetermined spaced relationship, said base and said headed elements being integrally molded from a polymeric material, each of said headed elements including
      i) a stem projecting from said base, and
      ii) a head connected to an end of said stem, said head of each headed element including a generally flat surface adjacent to said stem and extending radially outward from a periphery of said stem, and a curved surface bulging out with an apex and arranged at an opposite side of said generally flat surface from said stem; and
   c) means for reducing noise located on said heads due to relative movement between said fastener member and a second, like fastener member interengaged with said fastener member.

2. The interengaging fastener member of claim 1, wherein said means for reducing noise comprises a transition surface provided on said head of each of said headed elements for connecting said generally flat surface with said curved surface; said transition surface comprising a second curved surface.

3. The interengaging fastener member of claim 2, wherein the radius of curvature of said transition surface is between 0.05 mm and 0.5 mm.

4. The interengaging fastener member of claim 2, wherein the radius of curvature of said transition surface is between 5% and 20% of a maximum projected diameter of said head taken parallel to said generally flat surface.

5. The interengaging fastener member of claim 2, wherein at least one protrusion is formed on said generally flat surface of each of said headed elements.

6. The interengaging fastener member of claim 1, wherein said means for reducing noise further comprises a shock absorbing material arranged around the respective stems of each of said headed elements.

7. The interengaging fastener member of claim 6, wherein said shock absorbing material includes at least one of a glass wool, a sponge, a non-woven cloth, a cotton material, and a viscoelastic adhesive.

8. The interengaging fastener member of claim 1, wherein said base and said headed elements are integrally molded from polymeric materials by an injection molding process using a destructible stem mold.

9. A fastener including two interengaging fastener member, each comprising:
   a) a base;
   b) a plurality of headed elements arranged on said base in a predetermined spaced relationship, said base and said headed elements integrally molded from a polymeric material, each of said headed elements including
      i) a stem projecting from said base, and
      ii) a head connected to an end of said stem, said head of each headed element including a generally flat surface adjacent to said stem and extending radially outward from a periphery of said stem, and a curved surface bulging out with an apex and arranged at an opposite side of said generally flat surface from said stem; and
   c) means for reducing noise located on said heads due to relative movement between said respective fastener members when the fastener members are interengaged.

10. The fastener of claim 9, wherein said means for reducing noise comprises a transition surface provided on said head of a plurality of said headed elements of at least one of said interengaging fastener members for connecting said generally flat surface with said curved surface, said transition surface being a second curved surface.

11. The fastener of claim 10, wherein at least one protrusion is formed on said generally flat surface of a plurality of said headed elements on at least one of said interengaging fastener members.

12. The fastener of claim 9, wherein said means for reducing noise further comprises a shock absorbing material arranged around said stems of a plurality of said headed elements of at least one of said interengaging fastener members.

13. The fastener of claim 9, wherein a length of said stem of each of said headed elements of one interengaging fastener member is substantially equal to a height of said head of each of said headed elements of the other interengaging fastener member.

* * * * *